United States Patent
Zhu

(10) Patent No.: US 12,475,837 B2
(45) Date of Patent: Nov. 18, 2025

(54) PIXEL DRIVING CIRCUIT AND DISPLAY PANEL WITH VOLTAGE CONTROL SIGNAL TERMINAL OUTPUTTING LIGHTING CONTROL SIGNAL

(71) Applicant: Guangzhou China Star Optoelectronics Semiconductor Display Technology Co., LTd., Guangdong (CN)

(72) Inventor: Maoxia Zhu, Guangdong (CN)

(73) Assignee: Guangzhou China Star Optoelectronics Semiconductor Display Technology Co., LTd., Guangdong (CN)

( * ) Notice: Subject to any disclaimer, the term of this patent is extended or adjusted under 35 U.S.C. 154(b) by 0 days.

(21) Appl. No.: 18/569,205

(22) PCT Filed: Oct. 31, 2023

(86) PCT No.: PCT/CN2023/128859
§ 371 (c)(1),
(2) Date: Dec. 11, 2023

(87) PCT Pub. No.: WO2025/065795
PCT Pub. Date: Apr. 3, 2025

(65) Prior Publication Data
US 2025/0111820 A1   Apr. 3, 2025

(30) Foreign Application Priority Data

Sep. 28, 2023   (CN) .................. 202311284898.5

(51) Int. Cl.
*G09G 3/32*   (2016.01)
(52) U.S. Cl.
CPC .......... *G09G 3/32* (2013.01); *G09G 2310/08* (2013.01); *G09G 2320/0247* (2013.01)

(58) Field of Classification Search
CPC ................ G09G 3/32; G09G 2310/08; G09G 2320/0247
See application file for complete search history.

(56) References Cited

U.S. PATENT DOCUMENTS

| 10,825,380 B2* | 11/2020 | Kim | G09G 3/2003 |
| 11,373,583 B2* | 6/2022 | Yang | G09G 3/32 |

(Continued)

FOREIGN PATENT DOCUMENTS

| CN | 110556072 A | 12/2019 |
| CN | 111462679 A | 7/2020 |

(Continued)

OTHER PUBLICATIONS

Chinese Office Action issued in corresponding Chinese Patent Application No. 202311284898.5 dated Jul. 19, 2024, pp. 1-7.

(Continued)

*Primary Examiner* — Afroza Chowdhury
(74) *Attorney, Agent, or Firm* — PV IP PC; Wei Te Chung

(57) ABSTRACT

This application proposes a pixel driving circuit and a display panel including an output module, a current control module, and a duration control module. The duration control module includes a first input unit and a first capacitor connected to each other. A second plate of the first capacitor is connected to a voltage control signal terminal. The voltage control signal terminal outputs a periodic lighting control signal during a light emitting stage. When the voltage control signal terminal is configured in a first voltage range, the output module is turned on, and when it is configured in a second voltage range, the output module is turned off.

18 Claims, 8 Drawing Sheets

(56) References Cited

U.S. PATENT DOCUMENTS

2019/0371231 A1* 12/2019 Kim .................... G09G 3/32
2022/0139297 A1*  5/2022 Yang ................. G09G 3/3233
                                                    345/214

FOREIGN PATENT DOCUMENTS

| CN | 111477162 A | 7/2020 |
| CN | 115083336 A | 9/2022 |
| CN | 115482781 A | 12/2022 |
| CN | 116137136 A | 5/2023 |
| CN | 116189595 A | 5/2023 |
| KR | 20210063653 A | 6/2021 |

OTHER PUBLICATIONS

International Search Report in International application No. PCT/CN2023/128859, mailed on Jun. 1, 2024.
Written Opinion of the International Search Authority in International application No. PCT/CN2023/128859, mailed on Jun. 1, 2024.

* cited by examiner

PIXEL DRIVING CIRCUIT AND DISPLAY PANEL WITH VOLTAGE CONTROL SIGNAL TERMINAL OUTPUTTING LIGHTING CONTROL SIGNAL

TECHNICAL FIELD

The present application relates to the field of display technology, in particular to a pixel driving circuit and display panel.

BACKGROUND

Micro light emitting diodes, such as Mini LED and Micro LED, have significant advantages of higher brightness, better luminous efficiency, and lower power consumption, and have become the focus of research in the display panel industry.

At present, micro light emitting diodes usually use a hybrid driving method of pulse amplitude modulation (PAM) and a pulse width modulation (PWM) to control a display gray scale and pixel lighting time. During low-grayscale display, a driving current of a light emitting diode within one frame is small, causing a technical problem of flickering in a display device.

SUMMARY OF INVENTION

The present application provides a gate driving circuit and a display panel to solve a technical problem of a large frame of an existing display panel.

In order to solve the above issues, technical solutions provided by the present application are as follows:

The present application provides a pixel driving circuit to solve the technical problem of flickering in low-grayscale display of existing display panels.

In order to solve the above issues, technical solutions provided by the present application are as follows:

The present application provides a pixel driving circuit configured to provide a signal to a component to be driven, comprising:
- a current control module configured to transmit a first electrical signal;
- a duration control module configured to transmit a second electrical signal, wherein the duration control module comprises a first input unit and a first capacitor, the first input unit and a first plate of the first capacitor are connected to a first control node, and a second plate of the first capacitor is connected to a voltage control signal terminal;
- an output module, wherein a first end of the output module is electrically connected to the current control module, a second end of the output module is electrically connected to the duration control module, and a third end of the output module is electrically connected to the component to be driven;
- wherein during a light emitting stage of the pixel driving circuit, the voltage control signal terminal outputs a lighting control signal with a period, the lighting control signal comprises a first voltage range and a second voltage range, when the voltage control signal terminal is configured to output the first voltage range, the output module is turned on, and when the voltage control signal terminal is configured to output the second voltage range, the output module is turned off.

The present application further provides a display panel, the display panel comprises a plurality of sub-pixel units, each sub-pixel unit is provided with a pixel driving circuit and an component to be driven connected to each other, the pixel driving circuit is configured to provide a signal to the component to be driven; wherein the pixel driving circuit comprises:
- a current control module configured to transmit a first electrical signal;
- a duration control module configured to transmit a second electrical signal, wherein the duration control module comprises a first input unit and a first capacitor, the first input unit and a first plate of the first capacitor are connected to a first control node, and a second plate of the first capacitor is connected to a voltage control signal terminal;
- an output module, wherein a first end of the output module is electrically connected to the current control module, a second end of the output module is electrically connected to the duration control module, and a third end of the output module is electrically connected to the component to be driven;
- wherein during a light emitting stage of the pixel driving circuit, the voltage control signal terminal outputs a lighting control signal with a period, the lighting control signal comprises a first voltage range and a second voltage range, when the voltage control signal terminal is configured to output the first voltage range, the output module is turned on, and when the voltage control signal terminal is configured to output the second voltage range, the output module is turned off.

DETAILED DESCRIPTION OF ILLUSTRATED EMBODIMENTS

Figure 1:
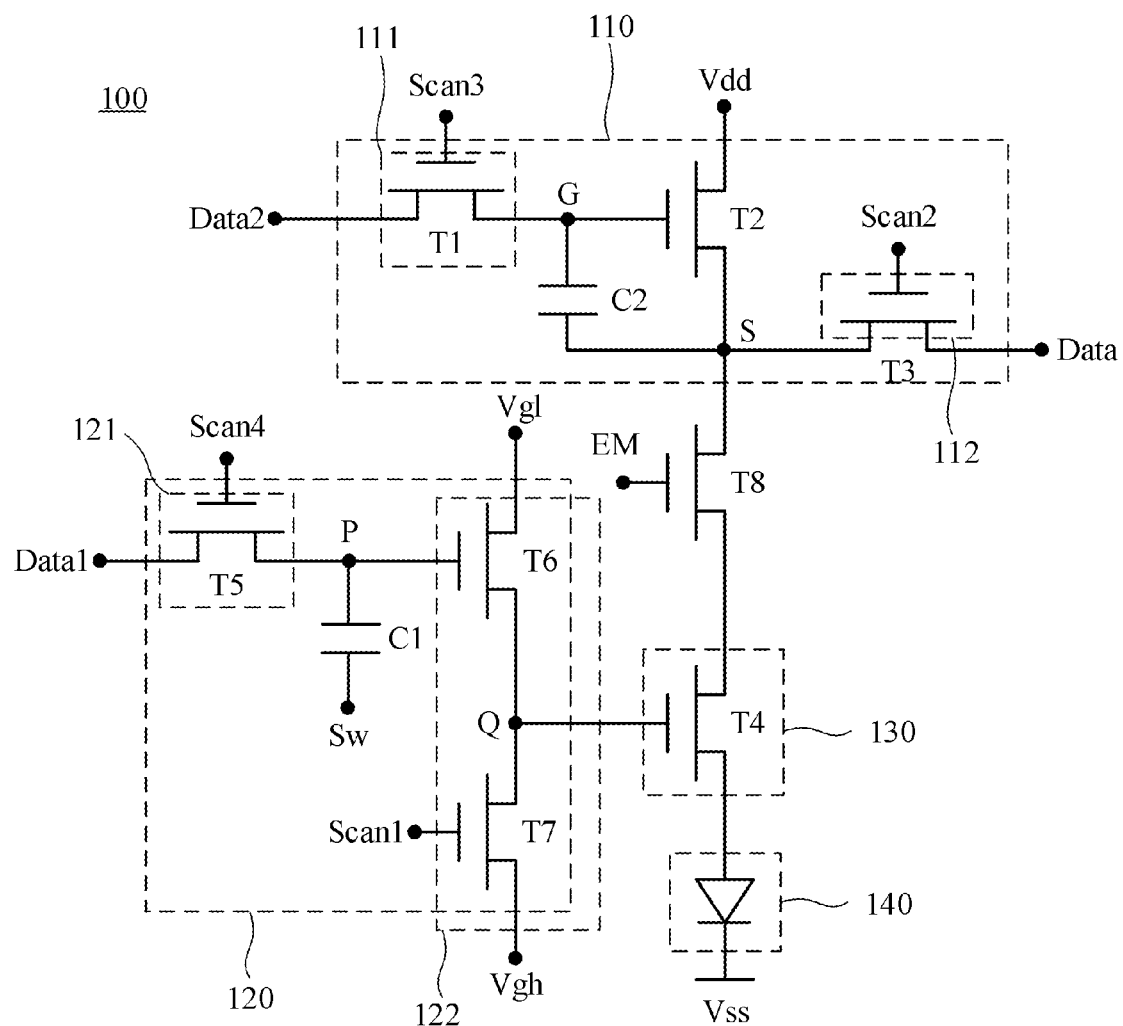
FIG. 1 is a first structural diagram of a pixel driving circuit of the present application.

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application. In addition, it should be understood that the specific implementations described here are only used to illustrate and explain the present application and are not intended to limit the present application. In this application, unless stated otherwise, the used orientation words such as "up" and "down" generally refer to up and down in the actual use or working state of the device. Specifically, it is the orientation in the drawings. The "inside" and "outside" refer to the outline of the installation.

At present, when a micro-LED display device displays low gray scale, a driving current of the LED is small within one frame, which causes the display device to flicker. This application proposes the following technical solutions based on the above technical problems:

Refer to FIG. 1 to FIG. 9, the present application provides a pixel driving circuit 100 configured to provide a signal to a component to be driven 140, which includes a current control module 110, a duration control module 120, and an output module 130 that are connected to each other. The current control module 110 may be configured to transmit a first electrical signal. The duration control module 120 may be configured to transmit a second electrical signal. The duration control module 120 is configured to control an opening time of the output module 130. The output module 130 is configured to transmit the first electrical signal output by the current control module 110 to the component to be driven 140.

In this embodiment, the duration control module 120 includes a first input unit 121 and a first capacitor C1. The first input unit 121 and a first plate of the first capacitor C1 are connected to a first control node P. A second plate of the first capacitor C1 is connected to a voltage control signal terminal Sw. The output module 130 may be electrically connected to the duration control module 120 and the current control module 110 respectively.

In this embodiment, a first end of the output module 130 is electrically connected to the current control module 110, a second end of the output module 130 is electrically connected to the duration control module 120, and a third end of the output module 130 is electrically connected to the component to be driven 140.

In this embodiment, during a light emitting stage t3 of the pixel driving circuit 100, the voltage control signal terminal Sw outputs a periodic light emitting control signal Sw1. The light emitting control signal Sw1 includes a first voltage range and a second voltage range. The output module 130 is turned on when the voltage control signal terminal Sw is configured in the first voltage range, and the output module 130 is turned off when the voltage control signal terminal Sw is configured in the second voltage range.

It should be noted that the first electrical signal is a current signal of the pixel driving circuit, and the second electrical signal is a time signal of the pixel driving circuit.

In the existing technology, the duration control module 120 and the current control module 110 are usually arranged in series to emit light after both the duration control module 120 and the current control module 110 complete data writing. The duration control module 120 and the current control module 110 are arranged in series, so that the duration control module 120 may affect an output current of the current control module 110. Especially at low gray levels, the output current of the current control module 110 may further decrease, resulting in a technical problem of flicker in the display device.

This application controls a conduction time of the output module 130 by regulating a potential of the first control node P in the duration control module 120. This enables the output of multiple pulse signals within one frame. At the same time, the current control module 110 and the output module 130 are connected in series so that the output current of the current control module 110 is not affected by the duration control module 120. This increases the driving current entering the component to be driven 140 and improves the technical problem of flicker in the display device at low gray levels.

Referring to FIG. 1, the duration control module 120 further includes a level amplification unit 122. A first end of the level amplification unit 122 is connected to the first control node P, and a second end of the level amplification unit 122 is connected to the second end of the output module 130.

In this embodiment, the level amplification unit 122 includes a first amplification transistor T6 and a second amplification transistor T7. A gate of the first amplification transistor T6 is connected to the first control node P. A drain of the first amplification transistor T6 is connected to a second control node Q. A gate of the second amplification transistor T7 is connected to a first scan signal terminal Scan1. A source of the second amplification transistor T7 is connected to the second control node Q, and the output module 130 is connected to the second control node Q.

In this embodiment, a source of the first amplification transistor T6 is connected to one of a first low voltage line Vg1 or a first high voltage line Vgh. A drain of the second amplification transistor T7 is connected to the other one of the first low voltage line Vg1 or the first high voltage line Vgh. For example, in the structure of FIG. 1, a source of the first amplification transistor T6 is connected to the first low voltage line Vg1. A drain of the second amplification transistor T7 is connected to the first high voltage line Vgh. Or in the structure of FIG. 2, the source of the first amplification transistor T6 is connected to the first high voltage line Vgh. The drain of the second amplification transistor T7 is connected to the first low voltage line Vg1.

In this embodiment, a first input unit 121 may include a first input transistor T5. A gate of the first input transistor T5 is connected to a fourth scan signal terminal Scan4, a source of the first input transistor T5 is connected to a first data signal terminal Data1, and a drain of the first input transistor T5 is connected to the first control node P.

In this embodiment, since the second plate of the first capacitor C1 is connected to the voltage control signal terminal Sw, and the voltage control signal terminal Sw outputs the periodic light emitting control signal Sw1, as the light emitting control signal Sw1 increases or decreases, the potential of the first control node P may change following the change of the light emitting control signal Sw1, and the potential change of the first control node P may control the on and off of the first amplification transistor T6, thereby controlling the potential change of the second control node Q.

In the pixel driving circuit 100 of the present application, the impedance of the first amplification transistor T6 is smaller than the impedance of the second amplification transistor T7. For example, during the light emitting stage t3 of the pixel driving circuit 100, the first scan signal terminal Scan1 outputs a high potential to turn on the second amplification transistor T7. The second control node Q may be connected to the first high voltage line Vgh, and the potential of the second control node Q may be pulled up to a high potential, thereby turning on the output module 130. The driving current output by the current control module 110 is transmitted to the component to be driven 140 through the output module 130, and the component to be driven 140 emits light. As the potential of the first control node P is pulled up, the first amplification transistor T6 is turned on. The second control node Q may be connected to the first high voltage line Vgh and the first low voltage line Vg1 at the same time. Since the impedance of the first amplification transistor T6 is smaller than the impedance of the second amplification transistor T7, the divided voltage of the second amplification transistor T7 is greater than the divided voltage of the first amplification transistor T6. Then, the potential of the second control node Q is pulled down to a low potential close to the first low voltage line Vg1, and then the output module 130 is turned off, and the component to be driven 140 does not emit light. Therefore, this application can regulate the conduction time of the output module 130 by regulating the output voltage of the voltage control signal terminal Sw. This avoids the influence of the duration control module 120 on the output current of the current control module 110.

In this embodiment, in the first stage t1 of the pixel driving circuit 100, a gate of the first input transistor T5 receives the high potential input from the fourth scan signal terminal Scan4, and the first input transistor T5 is turned on. The data signal input from the first data signal terminal Data1 is transmitted to the first control node P through the first input transistor T5. At this time, the potential of the first control node P is Va. In the second stage t2 of the pixel driving circuit 100, the first input transistor T5 is turned off, and the potential of the second plate of the first capacitor C1 drops from Vc1 to Vc2. At this time, the potential of the first control node P is Va−(Vc1−Vc2). During the light emitting stage t3 of the pixel driving circuit 100, the potential of the second plate of the first capacitor C1 increases by ΔV from Vc2. At this time, the potential of the first control node P is Va−(Vc1−Vc2)+ΔV. As ΔV gradually increases, when the difference between the potential of the first control node P and a threshold voltage Vth of the first amplification transistor T6 is greater than 0, the first amplification transistor T6 may be turned on. The potential of the second control node Q may be pulled down to a low potential, and the output module 130 may be turned off.

Figure 3:
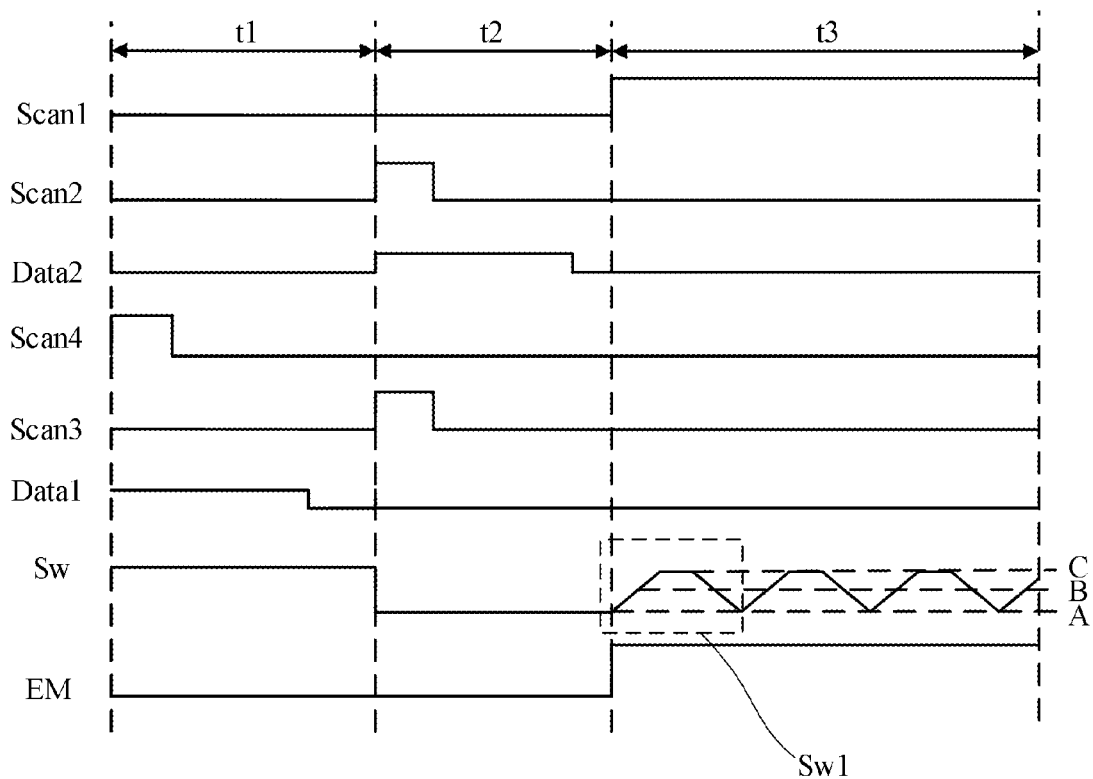
FIG. 3 is a timing control diagram in a pixel driving circuit of the present application.

In this embodiment, two adjacent light emitting control signals Sw1 are continuous, and the maximum value of the first voltage range is less than or equal to the minimum value of the second voltage range. For example, refer to FIG. 3, the voltage signal output by the voltage control signal terminal Sw during the light emitting stage t3 is a trapezoidal signal, and two adjacent trapezoidal signals are connected to each other. The area between the dotted lines AB in FIG. 3 is the first voltage range, and the dotted line BC is the second voltage range. When the voltage output by the voltage control signal terminal Sw exceeds the dotted line B, the difference between the potential of the first control node P and the threshold voltage Vth of the first amplification transistor T6 is greater than 0, and the first amplification transistor T6 may be turned on.

Figure 4:
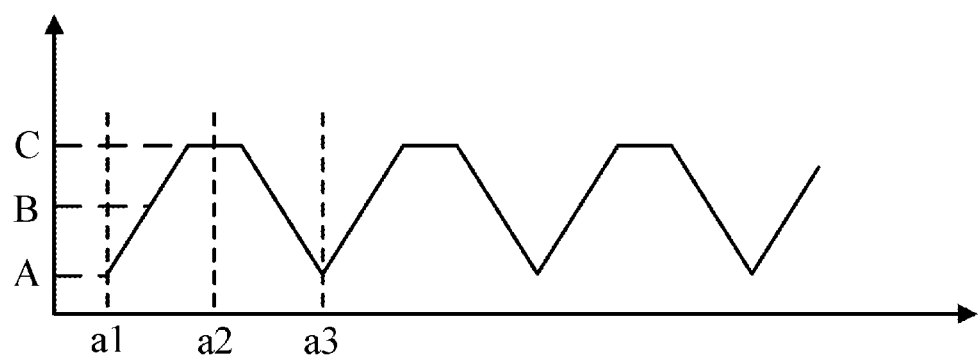
FIG. 4 is a timing control diagram of a lighting control signal in FIG. 3.

Referring to FIG. 4, in the light emitting stage of the pixel driving circuit, the voltage of the light emitting control signal at the first moment a1 may be the first voltage m1. The voltage of the light emitting control signal at the second moment a2 may be the second voltage m2. The voltage of the light emitting control signal at the third moment a3 may be the third voltage m3. The first voltage m1 and the third voltage m3 are within the first voltage range, and the second voltage m2 is within the second voltage range. At the same time, the first voltage m1 and the third voltage m3 may be equal and both are voltage A, and the second voltage m2 is voltage C.

In this embodiment, during the period from the first time a1 to the second time a2, the first voltage m1 is boosted to the second voltage m2. During the process from the second time a2 to the third time a3, the second voltage m2 is reduced to the third voltage m3.

In this embodiment, the waveform of the light emitting control signal Sw1 may be a sine wave, a triangular wave, a trapezoidal wave, etc. It should be noted that in order to display different gray scales, the output transistor needs a time difference to turn on and off. Since different data voltages in the square wave signal are turned on and off at the same time, there is no brightness difference.

In this embodiment, the first amplification transistor T6 includes a first channel, the second amplification transistor T7 includes a second channel, and the width of the first channel is greater than the width of the second channel. Alternatively, the length of the first channel is less than the length of the second channel.

In this embodiment, the impedance adjustment of the first amplification transistor T6 and the second amplification transistor T7 can be realized by adjusting the length and width of the channels in the corresponding transistors. For example, when the first channel and the second channel have the same length, the width of the first channel can be made greater than the width of the second channel. The increase in channel width increases the conduction rate of the transistor and reduces the impedance of the transistor. Therefore, the impedance of the first amplification transistor T6 is smaller than the impedance of the second amplification transistor T7. Alternatively, when the first channel and the second channel have the same width, the length of the first channel can be made shorter than the length of the second channel. The reduction in channel length increases the conduction rate of the transistor and reduces the impedance of the transistor. Therefore, the impedance of the first amplification transistor T6 is smaller than the impedance of the second amplification transistor T7.

In this embodiment, the first amplification transistor T6 includes a first gate, and the second amplification transistor T7 includes a second gate. The first gate has a first size in a direction from a source to a drain of the first amplification transistor T6. In a direction from a source to a drain of the second amplification transistor T7, the second gate has a second size, and the first size is larger than the second size. That is to say, the width of the first gate is greater than the width of the second gate, and the intensity of the electric field exerted by the first gate on the first channel is greater. This increases the conduction rate of the first amplification transistor T6 and reduces the impedance of the first amplification transistor T6. Therefore, the impedance of the first amplification transistor T6 is smaller than the impedance of the second amplification transistor T7.

Referring to FIG. 1, the current control module 110 includes a second input unit 111, a second capacitor C2, and a driving transistor T2. The second input unit 111, the first plate of the second capacitor C2, and the gate of the driving transistor T2 are connected to the third control node G. The second plate of the second capacitor C2 and the drain of the driving transistor T2 are connected to the fourth control node S, and the source of the driving transistor T2 is connected to the second high voltage line Vdd.

In this embodiment, the output module 130 includes an output transistor T4. The gate of the output transistor T4 is connected to the second control node Q, and the source of the output transistor T4 is connected to the fourth control node S. The drain of the output transistor T4 is connected to the first end of the component to be driven 140, and the second end of the element to be driven 140 is connected to the second low voltage line Vss.

In this embodiment, the second input unit 111 includes a second input transistor T1. The gate of the second input transistor T1 is connected to the third scan signal terminal Scan3, and the source of the second input transistor T1 is connected to the second data signal terminal Data2. The drain of the second input transistor T1 is connected to the third control node G. In the second stage t2 of the pixel driving circuit 100, the third scan signal terminal Scan3 inputs a high potential. The second input transistor T1 is turned on, and the data signal output by the second data signal terminal Data2 is transmitted to the third control node G through the second input transistor T1. At the same time, the second capacitor C2 starts to charge, and since the output transistor T4 is turned off, the driving current output by the driving transistor T2 cannot be transmitted to the component to be driven 140. During the light emitting stage t3, the second capacitor C2 maintains the potential of the third control node G to turn on the driving transistor T2. At this time, the output transistor T4 is turned on, and the driving current output by the driving transistor T2 is transmitted to the component to be driven.

Referring to FIG. 1, the pixel driving circuit 100 further includes a switching transistor T8 connecting the output module 130 and the current control module 110. A gate of the switching transistor T8 is connected to an enable signal line, and a source of the switching transistor T8 is connected to a fourth control node S. A drain of the switching transistor T8 is connected to the source of the output transistor T4. Since the driving transistor T2 and the switching transistor T8 are connected in series, in order to avoid the situation that the component to be driven 140 emits light during the non-light emitting stage t3, this application provides a switching transistor T8 between the driving transistor T2 and the switching transistor T8. The switching transistor T8 is turned on only during the light emitting stage t3.

Referring to FIG. 1, the current control module 110 also includes a reference unit 112 having a reference transistor T3. A gate of the reference transistor T3 is connected to the second scan signal terminal Scan2, and a source of the reference transistor T3 is connected to the reference voltage line. A drain of the reference transistor T3 is connected to the fourth control node S, and timing data output by the third scan signal terminal Scan3 is the same as timing data output by the second scan signal terminal Scan2. The driving current transmitted from the driving transistor T2 is related to the potential of the driving transistor T2 at the third control node G and the fourth control node S. Therefore, in order to ensure the accuracy of the potential of the fourth control node S, this application connects the fourth control node S to the reference voltage line to calibrate the potential of the fourth control node S in the second stage t2.

In this embodiment, in order to avoid the output transistor T4 from affecting the magnitude of the driving current transmitted from the current control module 110, when the driving element 140 is emitting light, the output transistor T4 needs to be fully turned on as much as possible. Therefore, the voltage of the first high voltage line Vgh needs to be as high as possible, and the voltage of the first low voltage line Vg1 needs to be as low as possible. For example, the voltage of the first high voltage line Vgh is greater than the voltage of the second high voltage line Vdd, and the voltage of the first low voltage line Vg1 is less than the voltage of the second low voltage line Vss.

The pixel driving circuit 100 in FIG. 1 of the present application may be described in detail below with reference to the timing diagram in FIG. 3.

Figure 5:
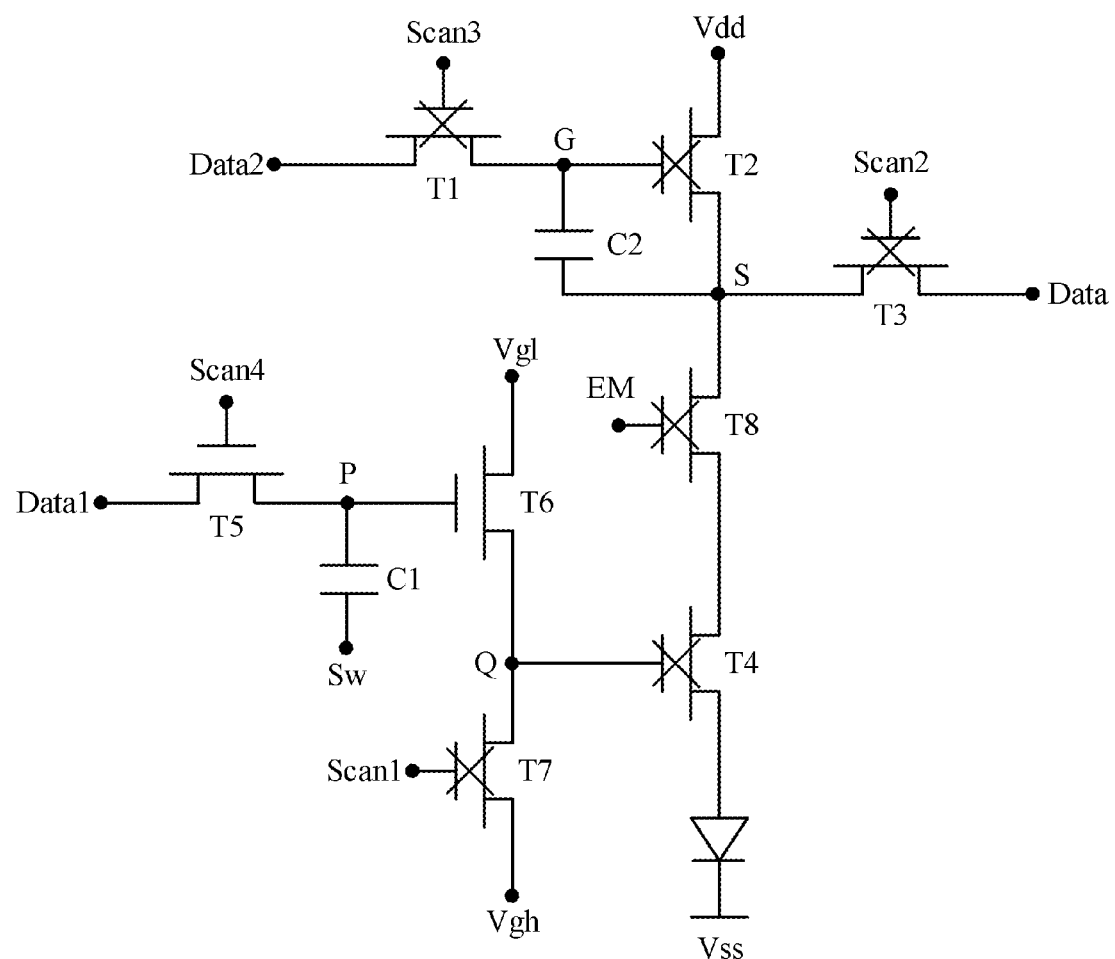
FIG. 5 is a state diagram of the pixel driving circuit in FIG. 1 in a first stage.

In the first stage t1, refer to FIG. 5, the first scan signal terminal Scan1, the second scan signal terminal Scan2, the third scan signal terminal Scan3, and the enable signal terminal output low potential, and the second input transistor T1, the reference transistor T3, the switching transistor T8, and the second amplification transistor T7 are turned off. The fourth scan signal terminal Scan4 outputs a high potential, and the first input transistor T5 is turned on. The data signal output by the first data signal terminal Data1 is transmitted to the first control node P through the source and drain of the first input transistor T5. The potential of the first control node P is pulled up to Va. At this time, the high potential of the first control node P turns on the first amplification transistor T6. The second control node Q is connected to the first low voltage line Vg1. The low potential of the second control node Q turns off the output transistor T4.

Figure 6:
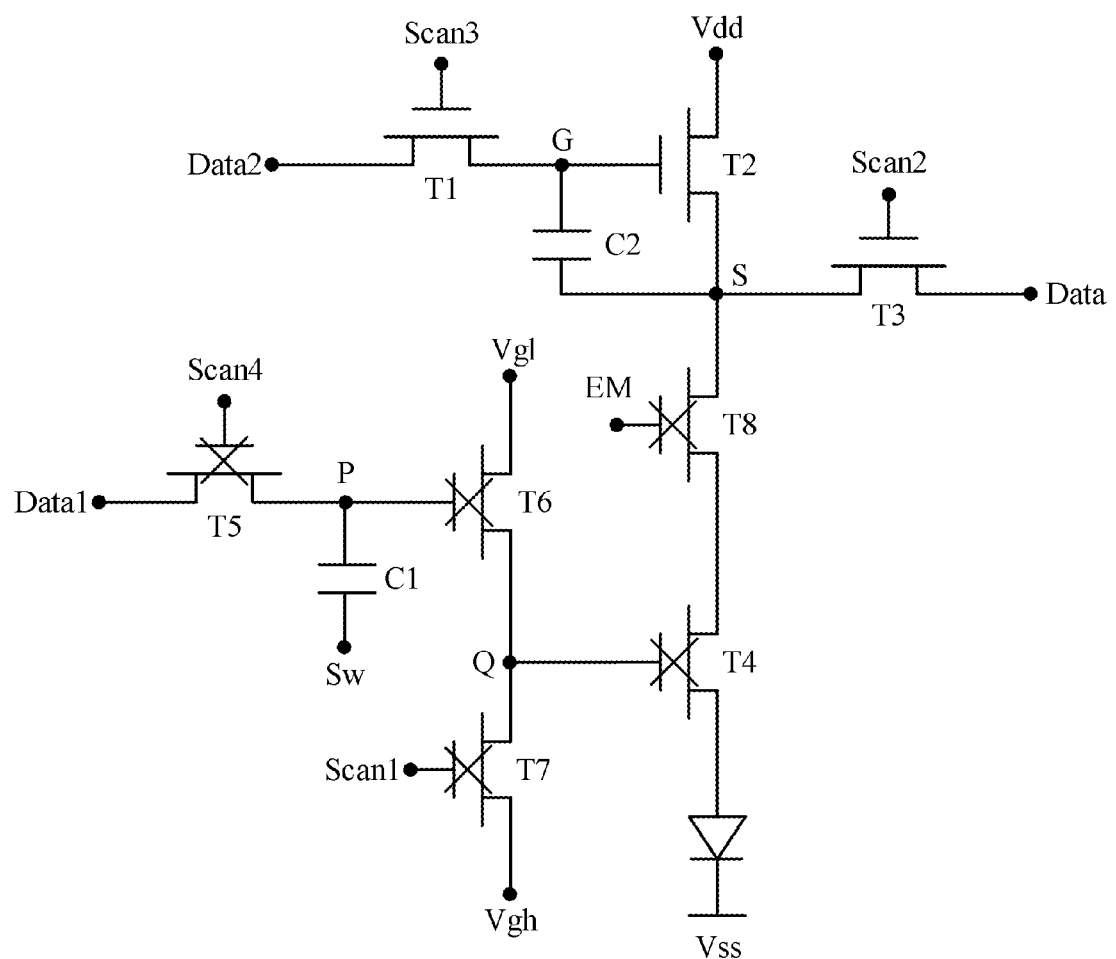
FIG. 6 is a state diagram of the pixel driving circuit in FIG. 1 in a second stage.

In the second stage t2, refer to FIG. 6, the first scan signal terminal Scan1, the fourth scan signal terminal Scan4, and the enable signal terminal output low potential. The first input transistor T5, the switching transistor T8, and the second amplification transistor T7 are turned off. The potential of the second plate in the first capacitor C1 drops from Vc1 to Vc2. At this time, the potential of the first control node P is Va−(Vc1−Vc2), and the potential of the first control node P is not enough to turn on the first amplification transistor T6. The first amplification transistor T6 is turned off, and the second control node Q maintains a low potential to turn off the output transistor T4.

Secondly, the second scan signal terminal Scan2 and the third scan signal terminal Scan3 output high potential. The second input transistor T1 and the reference transistor T3 are turned on. The data signal output by the second data signal terminal Data2 is transmitted to the third control node G through the source and drain of the second input transistor T1. The potential of the third control node G is raised to a high potential, and at the same time, the second capacitor C2 starts to charge. In addition, the reference voltage of the reference voltage line is transmitted to the fourth control node S through the reference transistor T3 to calibrate the potential of the fourth control node S to the reference potential.

Figure 7:
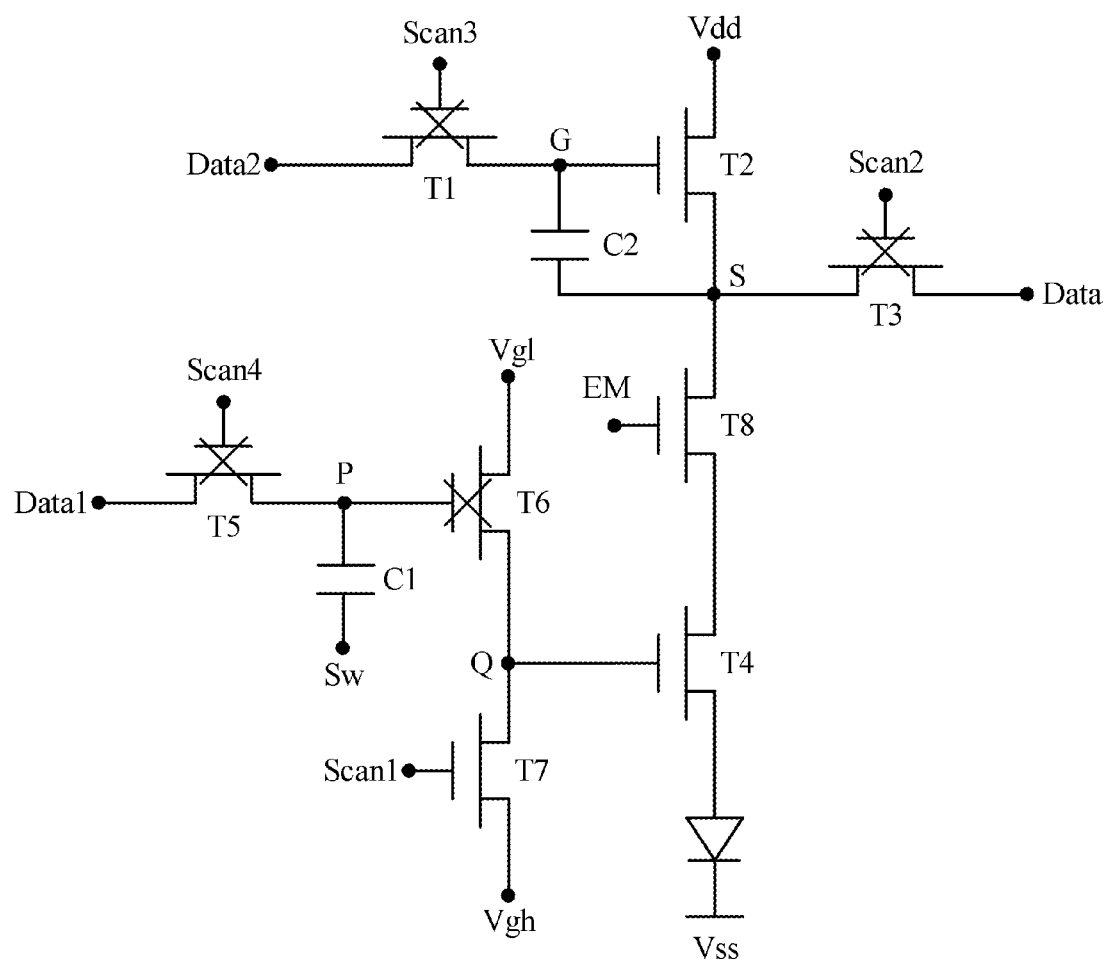
FIG. 7 is a first state diagram of the pixel driving circuit in FIG. 1 during a light emitting stage.
Figure 8:
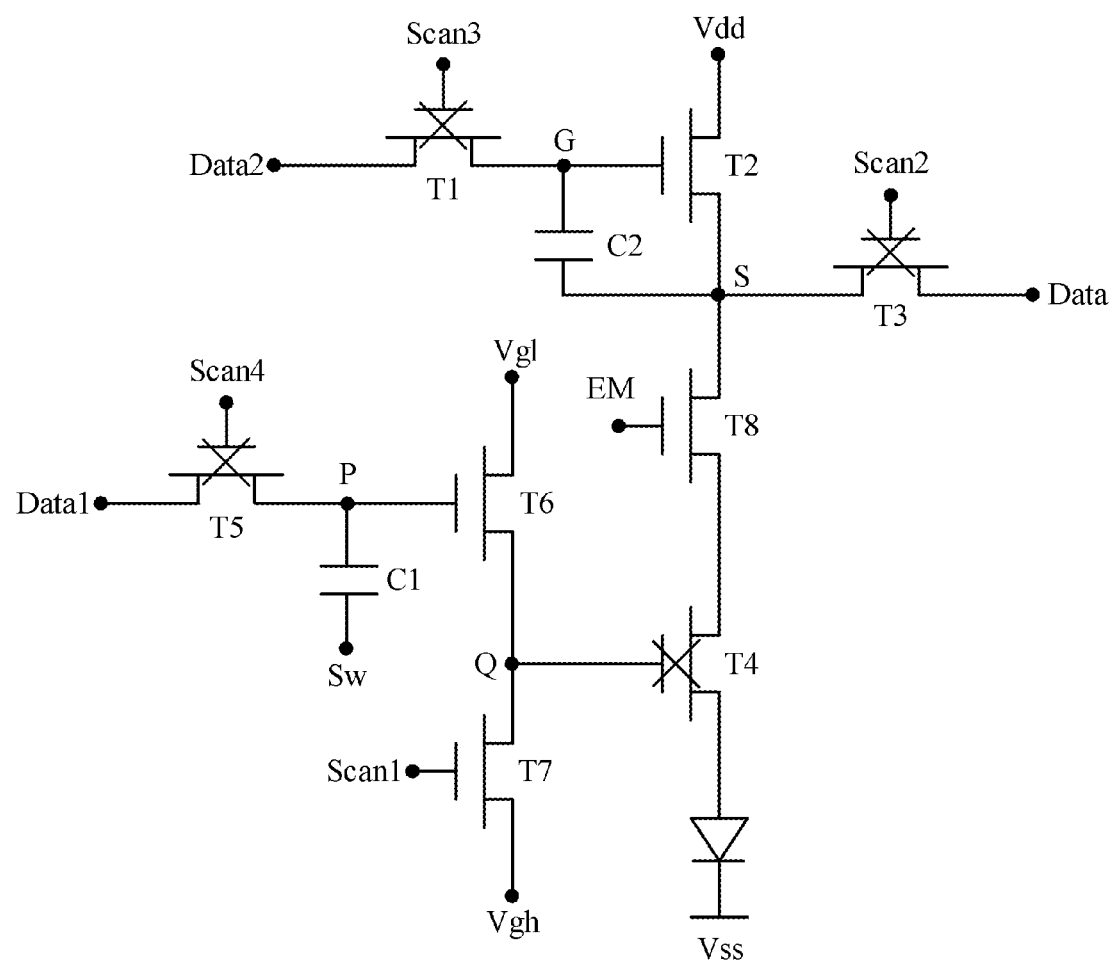
FIG. 8 is a second state diagram of the pixel driving circuit in FIG. 1 during a light emitting stage.

In the light emitting stage t3, refer to FIG. 7 and FIG. 8, the second scan signal terminal Scan2 and the third scan signal terminal Scan3 output low potential. The second input transistor T1 and the reference transistor T3 are turned off. The second capacitor C2 maintains the high potential of the third control node G to turn on the driving transistor T2.

Secondly, refer to FIG. 7, the first scan signal terminal Scan1 outputs low potential. The first input transistor T5 is turned off, and the fourth scan signal terminal Scan4 outputs a high potential. The second amplification transistor T7 is turned on, and the potential of the second control node Q is pulled up to a high potential, so that the output transistor T4 is turned on. At the same time, the enable signal terminal outputs a high potential, and the switching transistor T8 is turned on. The driving current output by the current control module 110 is transmitted to the component to be driven 140 through the source and drain of the switching transistor T8 and the source and drain of the output transistor T4, so that the component to be driven 140 emits light.

Again, refer to FIG. 8, when the potential of the second plate of the first capacitor C1 increases by ΔV from Vc2, the potential of the first control node P is Va−(Vc1−Vc2)+ΔV As ΔV gradually increases, when the difference between the potential of the first control node P and the threshold voltage Vth of the first amplification transistor T6 is greater than 0, the first amplification transistor T6 may be turned on. The second control node Q may be connected to the first high voltage line Vgh and the first low voltage line Vg1 at the same time. The impedance of the first amplification transistor T6 is smaller than the impedance of the second amplification transistor T7, so the divided voltage of the second amplification transistor T7 is greater than the divided voltage of the first amplification transistor T6. Then the potential of the second control node Q is pulled down to a low potential close to the first low voltage line Vg1, the output module 130 is turned off, and the component to be driven 140 does not emit light.

Finally, when the potential of the second plate of the first capacitor C1 gradually decreases and when the difference between the potential of the first control node P and the threshold voltage Vth of the first amplification transistor T6 is less than or equal to 0, the first amplification transistor T6 may be turned off, the potential of the second control node Q may be pulled up to a high potential, and the output transistor T4 may be turned on. The driving current output by the current control module 110 is transmitted to the component to be driven 140, and the component to be driven 140 emits light.

For example, in the light emitting stage t3 of FIG. 3, the area between the dotted lines AB in FIG. 3 is the first voltage range. The dotted line BC is the second voltage range. When the voltage output by the voltage control signal terminal Sw is between the dotted lines BC, the difference between the potential of the first control node P and the threshold voltage Vth of the first amplification transistor T6 is greater than 0. The first amplification transistor T6 may be turned on, the second control node Q may be pulled down to a low potential, the output transistor T4 may be turned off, and the component to be driven 140 may not emit light. When the voltage output by the voltage control signal terminal Sw is between the dotted lines AB, the difference between the potential of the first control node P and the threshold voltage Vth of the first amplification transistor T6 is less than or equal to 0. The first amplification transistor T6 may be turned off, the second control node Q may be pulled to a high potential, the output transistor T4 may be turned on, and the component to be driven 140 may emit light.

It should be noted that the timing control diagram in FIG. 3 takes as an example that the transistors in the pixel driving circuit 100 are all N-type transistors. The transistors in the pixel driving circuit 100 of the present application may also be P-type transistors, or a mixture of P-type transistors or N-type transistors. There are different timing control diagrams corresponding to different types of transistors.

Figure 2:
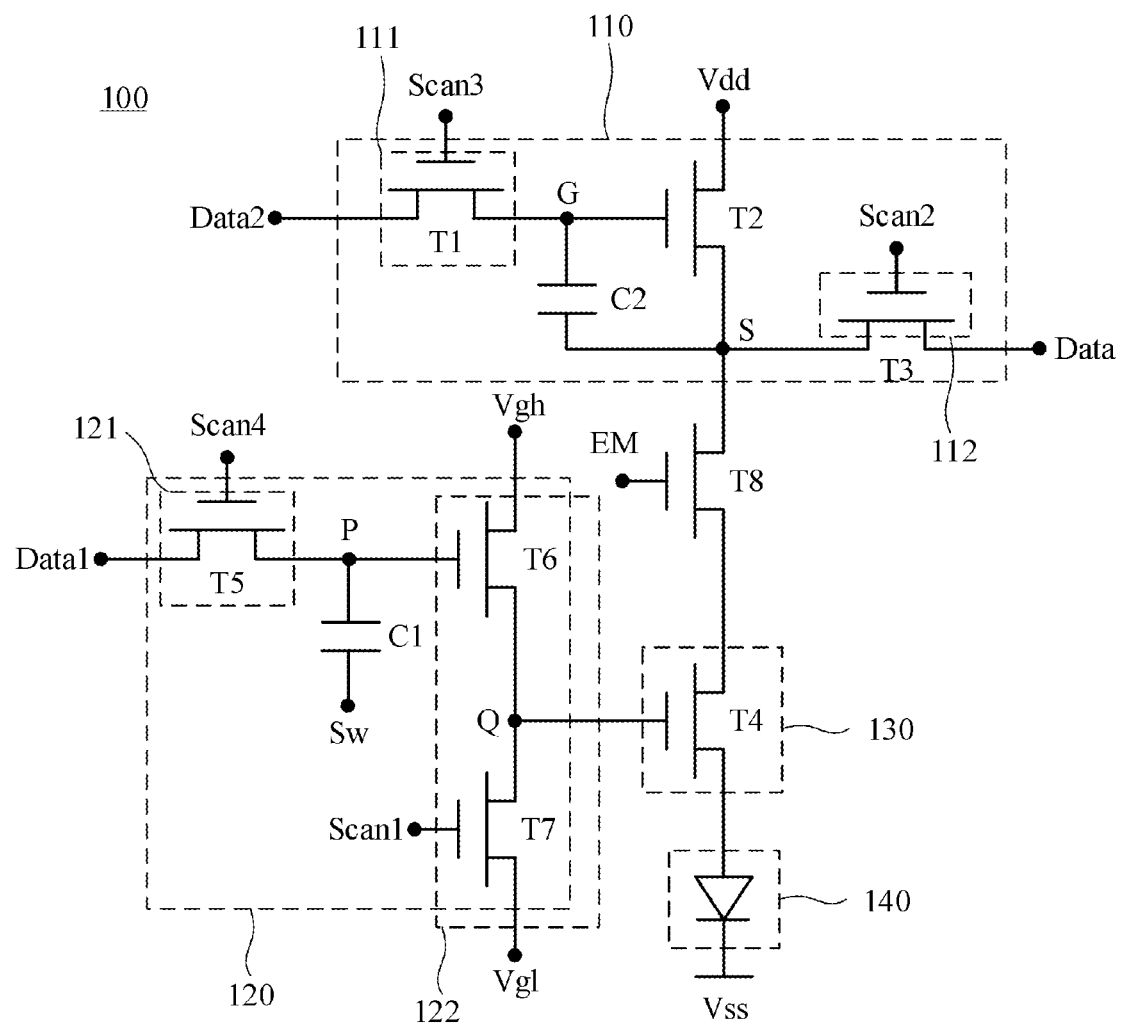
FIG. 2 is a second structural diagram of a pixel driving circuit of the present application.

For the pixel driving circuit in FIG. 2, in the first stage t1, the first amplification transistor T6 is turned on. The second control node Q is at a high potential, and the output transistor T4 is turned on. Since the switching transistor T8 is turned off, the component to be driven does not emit light at this stage. In the second stage t2, the switching transistor T8 is turned off, and the component to be driven does not emit light. In the third phase, switching transistor T8 is turned on. However, since the second amplification transistor T7 is turned on, the second control node Q is pulled down to a low potential, and the output transistor T4 is turned off. As the potential of the first control node P increases, the first amplification transistor T6 is turned on, and the second control node Q may be connected to the first high voltage line Vgh and the first low voltage line Vg1 at the same time. The impedance of the first amplification transistor T6 is smaller than the impedance of the second amplification transistor T7, so that the divided voltage of the second amplification transistor T7 is greater than the divided voltage of the first amplification transistor T6. The potential of the second control node Q is pulled down to a high potential close to the first high voltage line Vgh, the output module 130 is turned on, and the component to be driven 140 emits light.

Figure 9:
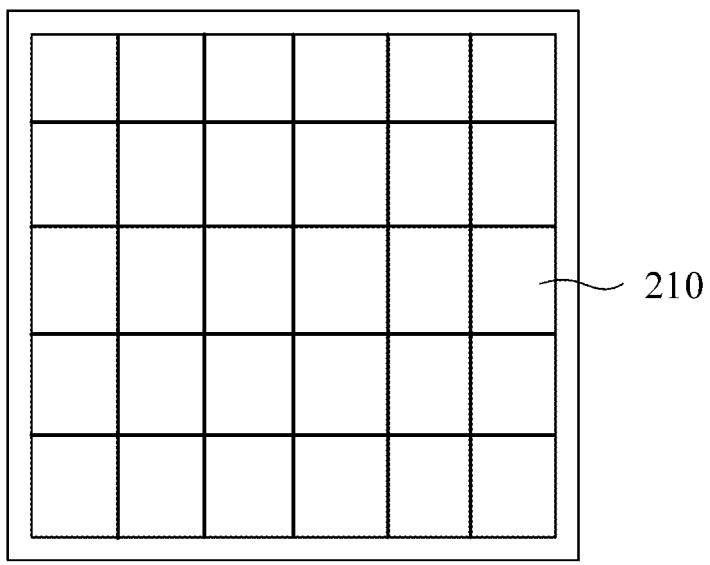
FIG. 9 is a schematic structural diagram of a display panel of the present application.

Referring to FIG. 9, this application also proposes a display panel 200. The display panel 200 includes a plurality of sub-pixel units 210. The above-mentioned pixel driving circuit 100 and the component to be driven 140 are provided in each sub-pixel unit. The pixel driving circuit 100 and the component to be driven 140 are connected to each other. The components to be driven are current-driven light-emitting diodes, such as Mini LEDs, Micro LEDs, or conventional LEDs.

This application also proposes a display device, which includes a terminal body and the above-mentioned display panel. The terminal body and the display panel are combined into one body. The terminal body may be a circuit board or other device bound to the display panel. The display device may include electronic devices such as mobile phones, televisions, and laptops.

In the above embodiments, each embodiment is described with different emphasis. For parts that are not described in detail in a certain embodiment, please refer to the relevant descriptions of other embodiments.

The above describes in detail a pixel driving circuit provided by embodiments of the present application. This article uses specific examples to illustrate the principles and implementation methods of this application. The description of the above embodiments is only used to help understand the technical solution and its core idea of the present application. Those of ordinary skill in the art should understand that they can still make modifications to the technical solutions recorded in the foregoing embodiments. Or make equivalent replacements for some of the technical features. However, these modifications or substitutions do not cause the essence of the corresponding technical solutions to depart from the scope of the technical solutions of the embodiments of the present application.

What is claimed is:

1. A pixel driving circuit configured to provide a signal to a component to be driven, comprising:
    a current control module configured to transmit a first electrical signal;
    a duration control module configured to transmit a second electrical signal, wherein the duration control module comprises a first input unit and a first capacitor, the first input unit and a first plate of the first capacitor are connected to a first control node, and a second plate of the first capacitor is connected to a voltage control signal terminal;
    an output module, wherein a first end of the output module is electrically connected to the current control module, a second end of the output module is electrically connected to the duration control module, and a third end of the output module is electrically connected to the component to be driven;
    wherein during a light emitting stage of the pixel driving circuit, the voltage control signal terminal outputs a lighting control signal with a period, the lighting control signal comprises a first voltage range and a second voltage range, when the voltage control signal terminal is configured to output the first voltage range, the output module is turned on, and when the voltage control signal terminal is configured to output the second voltage range, the output module is turned off;
    wherein the duration control module further comprises a level amplification unit, a first end of the level amplification unit is connected to the first control node, and a second end of the level amplification unit is connected to the second end of the output module.

2. The pixel driving circuit according to claim 1, wherein the level amplification unit comprises a first amplification transistor and a second amplification transistor, a gate of the first amplification transistor is connected to the first control node, a drain of the first amplification transistor is connected to a second control node, a gate of the second amplification transistor is connected to a first scan signal terminal, a source of the second amplification transistor is connected to the second control node, and the output module is connected to the second control node;
wherein, a source of the first amplification transistor is connected to one of a first low voltage line or a first high voltage line, a drain of the second amplification transistor is connected to another of the first low voltage line or the first high voltage line, and an impedance of the first amplification transistor is less than an impedance of the second amplification transistor.

3. The pixel driving circuit according to claim 2, wherein the first amplification transistor comprises a first channel, and the second amplification transistor comprises a second channel;
wherein a width of the first channel is greater than a width of the second channel, or a length of the first channel is less than a length of the second channel.

4. The pixel driving circuit according to claim 2, wherein the first amplification transistor comprises a first gate, and the second amplification transistor comprises a second gate;
the first gate has a first size in a direction from a source to a drain of the first amplification transistor, the second gate has a second size in a direction from a source to a drain of the second amplification transistor, and the first size is greater than the second size.

5. The pixel driving circuit according to claim 1, wherein the current control module comprises a second input unit, a second capacitor, and a driving transistor, the second input unit, a first plate of the second capacitor and a gate of the driving transistor are connected to a third control node, a second plate of the second capacitor and a drain of the driving transistor are connected to a fourth control node, and a source of the driving transistor is connected to the second high voltage line;
wherein the output module comprises an output transistor, a gate of the output transistor is connected to the second control node, a source of the output transistor is connected to the fourth control node, and a drain of the output transistor is connected to a first end of the component to be driven.

6. The pixel driving circuit according to claim 5, wherein a second end of the component to be driven is connected to a second low voltage line, a voltage of a first high voltage line is greater than a voltage of a second high voltage line, and a voltage of a first low voltage line is less than a voltage of the second low voltage line.

7. A display panel, wherein the display panel comprises a plurality of sub-pixel units, each sub-pixel unit is provided with the pixel driving circuit according to claim 1 and a component to be driven connected to each other.

8. The display panel according to claim 7, wherein the level amplification unit comprises a first amplification transistor and a second amplification transistor, a gate of the first amplification transistor is connected to the first control node, a drain of the first amplification transistor is connected to a second control node, a gate of the second amplification transistor is connected to a first scan signal terminal, a source of the second amplification transistor is connected to the second control node, and the output module is connected to the second control node;
wherein, a source of the first amplification transistor is connected to one of a first low voltage line or a first high voltage line, a drain of the second amplification transistor is connected to another of the first low voltage line or the first high voltage line, and an impedance of the first amplification transistor is less than an impedance of the second amplification transistor.

9. The display panel according to claim 8, wherein the first amplification transistor comprises a first channel, and the second amplification transistor comprises a second channel;
wherein a width of the first channel is greater than a width of the second channel, or a length of the first channel is less than a length of the second channel.

10. The display panel according to claim 8, wherein the first amplification transistor comprises a first gate, and the second amplification transistor comprises a second gate;
the first gate has a first size in a direction from a source to a drain of the first amplification transistor, the second gate has a second size in a direction from a source to a drain of the second amplification transistor, and the first size is greater than the second size.

11. The display panel according to claim 7, wherein the current control module comprises a second input unit, a second capacitor, and a driving transistor, the second input unit, a first plate of the second capacitor and a gate of the driving transistor are connected to a third control node, a second plate of the second capacitor and a drain of the driving transistor are connected to a fourth control node, and a source of the driving transistor is connected to the second high voltage line;
wherein the output module comprises an output transistor, a gate of the output transistor is connected to the second control node, a source of the output transistor is connected to the fourth control node, and a drain of the output transistor is connected to a first end of the component to be driven.

12. The display panel according to claim 11, wherein a second end of the component to be driven is connected to a second low voltage line, a voltage of a first high voltage line is greater than a voltage of a second high voltage line, and a voltage of a first low voltage line is less than a voltage of the second low voltage line.

13. A pixel driving circuit configured to provide a signal to a component to be driven, comprising:
a current control module configured to transmit a first electrical signal;
a duration control module configured to transmit a second electrical signal, wherein the duration control module comprises a first input unit and a first capacitor, the first input unit and a first plate of the first capacitor are connected to a first control node, and a second plate of the first capacitor is connected to a voltage control signal terminal;
an output module, wherein a first end of the output module is electrically connected to the current control module, a second end of the output module is electrically connected to the duration control module, and a third end of the output module is electrically connected to the component to be driven;
wherein during a light emitting stage of the pixel driving circuit, the voltage control signal terminal outputs a lighting control signal with a period, the lighting control signal comprises a first voltage range and a second voltage range, when the voltage control signal terminal is configured to output the first voltage range, the output module is turned on, and when the voltage control signal terminal is configured to output the second voltage range, the output module is turned off;

wherein two adjacent light emitting control signals are continuous, and a maximum value of the first voltage range is less than or equal to a minimum value of the second voltage range.

14. The pixel driving circuit according to claim 13, wherein a voltage of the light emitting control signal at a first moment is a first voltage, a voltage of the light emitting control signal at a second moment is a second voltage, a voltage of the light emitting control signal at a third moment is a third voltage, the first voltage and the third voltage are within the first voltage range, and the second voltage is within the second voltage range;

wherein in a process from the first moment to the second moment, the first voltage is boosted to the second voltage, and during a process from the second moment to the third moment, the second voltage is reduced to the third voltage.

15. The pixel driving circuit according to claim 13, wherein a waveform of the light emitting control signal is a sine wave, a triangular wave, or a trapezoidal wave.

16. A display panel, wherein the display panel comprises a plurality of sub-pixel units, each sub-pixel unit is provided with the pixel driving circuit according to claim 13 and a component to be driven connected to each other.

17. The display panel according to claim 16, wherein a voltage of the light emitting control signal at a first moment is a first voltage, a voltage of the light emitting control signal at a second moment is a second voltage, a voltage of the light emitting control signal at a third moment is a third voltage, the first voltage and the third voltage are within the first voltage range, and the second voltage is within the second voltage range;

wherein in a process from the first moment to the second moment, the first voltage is boosted to the second voltage, and during a process from the second moment to the third moment, the second voltage is reduced to the third voltage.

18. The display panel according to claim 16, wherein a waveform of the light emitting control signal is a sine wave, a triangular wave, or a trapezoidal wave.

* * * * *